L. DESCAMPS.
APPARATUS FOR THE MANUFACTURE OF A MIXTURE OF SULFUR DIOXID AND NITROGEN.
APPLICATION FILED JULY 14, 1916.

1,254,992. Patented Jan. 29, 1918.

Inventor:
Louis Descamps
By Attys
Fraser, Purk & Myers

UNITED STATES PATENT OFFICE.

LOUIS DESCAMPS, OF CHATEAUROUX, FRANCE.

APPARATUS FOR THE MANUFACTURE OF A MIXTURE OF SULFUR DIOXID AND NITROGEN.

1,254,992.	Specification of Letters Patent.	Patented Jan. 29, 1918.

Application filed July 14, 1916. Serial No. 109,304.

*To all whom it may concern:*

Be it known that I, LOUIS DESCAMPS, a citizen of the Republic of France, residing in Chateauroux, Department of Indre, France, have invented certain new and useful Improvements in Apparatus for the Manufacture of a Mixture of Sulfur Dioxid and Nitrogen, of which the following is a specification.

This invention is for the purpose of obtaining a mixture of sulfur dioxid and nitrogen, industrially free from oxygen. The mixed gases free from oxygen, obtained by a perfect combustion of sulfur in air, may be applied for any useful purpose, for example, the manufacture of hydrosulfites with utilization of the residuary nitrogen.

To secure perfect combustion of the sulfur in the oxygen of the air the proportion of dry air introduced into the furnace is adjusted, the air is heated suitably before the combustion, and the heated air is brought in a thin layer in contact with the burning and molten sulfur, so that the temperature attained is suitable for completely converting all the oxygen into sulfur dioxid.

The construction of apparatus or furnace suitable for the process just described, will be well understood from the accompanying drawings which show an example of the furnace.

Figure 1:
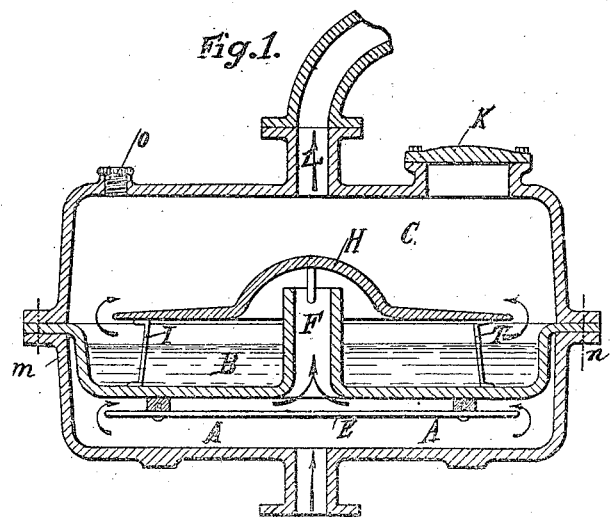
Figure 2:
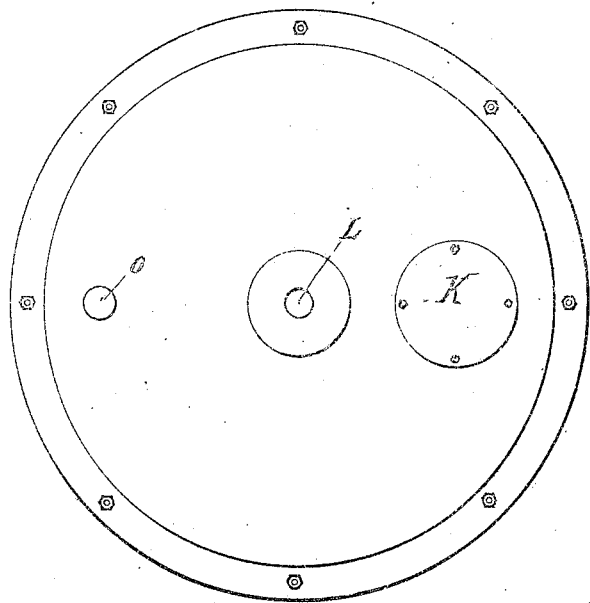

Figure 1 is a vertical section and Fig. 2 a plan.

The circular furnace comprises three essential parts: an air heating chamber A, a sulfur pan B, and a combustion chamber C.

The sulfur is introduced into the chamber C through a charging door K which is then closed hermetically. An orifice closed by a screw stopper O affords a passage through which the sulfur may be ignited. The sulfur melts rapidly and collects as a liquid layer in pan B. The charge of sulfur introduced through K is such that the level of the liquid sulfur is never above the level $m\,n$.

The atmospheric air, as dry as possible, and adjusted in quantity by any suitable known device, is admitted by the pipe D; it is heated by passing along the chamber A past the circular baffle plate E, and then flows through the vertical pipe F. As it leaves this pipe, the air is reflected on to the bath of liquid sulfur B by a circular cap H supported by feet I. The hot air in licking the large surface $m\,n$ of the liquid sulfur is almost completely deprived of its oxygen which burns to form $SO_2$. The mixture of sulfur dioxid and nitrogen leaving the opening L is conducted into any known purifying apparatus which condenses sulfur vapor, before being brought to the apparatus for using the mixture.

What I claim is:—

1. Apparatus for manufacturing sulfur dioxid industrially free from oxygen, comprising an air chamber with a baffle, a sulfur pan, a cap for reflecting the air entering the pan, and a combustion chamber provided with an exit pipe, substantially as described.

2. Apparatus for manufacturing sulfur dioxid industrially free from oxygen, comprising a pan adapted to contain molten sulfur, a cap above said pan, an air inlet through said pan, a deflector above said inlet adapted to deflect and guide the air in a thin layer over the surface of the sulfur in said pan, and means for heating air entering said inlet.

3. Apparatus for manufacturing sulfur dioxid industrially free from oxygen, comprising a pan adapted to contain molten sulfur, a cap above said pan, an air inlet through said pan, a deflector above said inlet adapted to deflect and guide the air in a thin layer over the surface of the sulfur in said pan, and means for heating air entering said inlet, said means comprising a baffle-plate beneath said pan adapted to conduct air in a thin layer along the heated under side of said pan to said air inlet.

4. Apparatus for manufacturing sulfur dioxid industrially free from oxygen, comprising a pan adapted to contain molten sulfur, a cap above said pan, an air inlet through said pan, a deflector above said inlet adapted to deflect and guide the air in a thin layer over the surface of the sulfur in said pan, and means for heating air entering said inlet comprising a jacket A in which said pan sets, said cap, pan and jacket having flanges adapted to be bolted together.

In witness whereof I have hereunto signed my name in the presence of two subscribing witnesses.

LOUIS DESCAMPS.

Witnesses:
 LOUIS MASSEROTT,
 R. H. WILLIAMS.